(12) United States Patent
Park et al.

(10) Patent No.: US 12,440,168 B2
(45) Date of Patent: Oct. 14, 2025

(54) PERSONALIZED ELECTRIC FIELD CANCER TREATMENT METHOD AND DEVICE

(71) Applicant: ELECTRONICS AND TELECOMMUNICATIONS RESEARCH INSTITUTE, Daejeon (KR)

(72) Inventors: Hyung Ju Park, Daejeon (KR); Soo Jun Park, Daejeon (KR); Chul Huh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 353 days.

(21) Appl. No.: 17/988,020

(22) Filed: Nov. 16, 2022

(65) Prior Publication Data

US 2023/0346319 A1    Nov. 2, 2023

(30) Foreign Application Priority Data

Apr. 27, 2022 (KR) ........................ 10-2022-0051812

(51) Int. Cl.
*A61B 5/00* (2006.01)
*A61B 18/14* (2006.01)
(Continued)

(52) U.S. Cl.
CPC ............ *A61B 5/7271* (2013.01); *A61B 18/14* (2013.01); *A61N 1/0476* (2013.01); *A61N 1/36002* (2017.08); *A61N 1/40* (2013.01)

(58) Field of Classification Search
CPC .. A61B 5/7271; A61B 18/14; A61N 1/36002; A61N 1/0476; A61N 1/40
See application file for complete search history.

(56) References Cited

U.S. PATENT DOCUMENTS

| 8,465,533 | B2 | 6/2013 | Palti |
| 2012/0163690 | A1 | 6/2012 | Jeon et al. |

(Continued)

FOREIGN PATENT DOCUMENTS

| KR | 10-1474582 B1 | 12/2014 |
| KR | 10-2020-0004228 A | 1/2020 |

(Continued)

OTHER PUBLICATIONS

Yi Na Yoon et al., "Barium Titanate Nanoparticles Sensitise Treatment-Resistant Breast Cancer Cells to the Antitumor Action of Tumour-Treating Fields", Scientific Reports, (2020) 10:2560.

*Primary Examiner* — Benjamin J Klein
*Assistant Examiner* — Thien Jason Tran
(74) *Attorney, Agent, or Firm* — LRK PATENT LAW FIRM

(57) ABSTRACT

According to an embodiment of the present disclosure, a treatment method includes: obtaining patient information, tumor information and electric field-related information; calculating an electric field strength applied to a first tumor region based on the patient information, the tumor information and the electric field-related information; and determining the number of electrodes, locations of the electrodes and an application time based on the calculated electric field strength.

13 Claims, 5 Drawing Sheets

(51) Int. Cl.
   *A61N 1/04*   (2006.01)
   *A61N 1/36*   (2006.01)
   *A61N 1/40*   (2006.01)

(56) References Cited

U.S. PATENT DOCUMENTS

| | | | |
|---|---|---|---|
| 2012/0190911 A1* | 7/2012 | McKenna | A61N 1/406 |
| | | | 604/20 |
| 2020/0094051 A1* | 3/2020 | Park | A61N 1/36002 |
| 2020/0206497 A1* | 7/2020 | Thyagarajan | A61N 1/323 |
| 2021/0228896 A1 | 7/2021 | Yoon et al. | |
| 2021/0299462 A1 | 9/2021 | Inaniwa et al. | |
| 2022/0001173 A1* | 1/2022 | Thyagarajan | A61N 1/40 |
| 2023/0256243 A1 | 8/2023 | Yoon et al. | |

FOREIGN PATENT DOCUMENTS

| | | |
|---|---|---|
| KR | 10-2020-0034588 A | 3/2020 |
| KR | 10-2104961 B1 | 4/2020 |
| KR | 10-2020-0083231 A | 7/2020 |
| KR | 10-2021-0094343 A | 7/2021 |
| KR | 10-2022-0043282 A | 4/2022 |
| WO | 2019/244854 A1 | 12/2019 |

\* cited by examiner

PERSONALIZED ELECTRIC FIELD CANCER TREATMENT METHOD AND DEVICE

CROSS REFERENCE TO RELATED APPLICATION

The present application claims priority to Korean Patent Application 10-2022-0051812, filed Apr. 27, 2022, the entire contents of which is incorporated herein for all purposes by this reference.

BACKGROUND OF THE INVENTION

1. Field of the Invention

The present disclosure relates to a personalized electric field cancer treatment method and device. Specifically, the present disclosure proposes a method of predicting conditions for increasing electric field cancer treatment efficiency according to patient characteristics.

2. Description of Related Art

Cancer is usually treated on the basis of surgery, chemotherapy, and radiation therapy. Existing cancer treatment methods have problems in that the quality of life of cancer patients decreases due to increased pain of patients due to damage to normal tissues and inconvenience of hospitalization or outpatient treatment.

SUMMARY OF THE INVENTION

The present disclosure relates to a method of predicting conditions for increasing electric field cancer treatment efficiency for each individual. According to the present disclosure, it is possible to input tumor information and surrounding area and to predict optimum conditions for an electrode capable of generating optimum treatment efficiency.

Other objects and advantages of the present invention will become apparent from the description below and will be clearly understood through embodiments. In addition, it will be easily understood that the objects and advantages of the present disclosure may be realized by means of the appended claims and a combination thereof.

According to an embodiment of the present disclosure, a treatment method comprising: obtaining patient information, tumor information and electric field-related information; calculating an electric field strength applied to a first tumor region based on the patient information, the tumor information and the electric field-related information; and determining the number of electrodes, locations of the electrodes and an application time based on the calculated electric field strength.

According to another embodiment of the present disclosure, a treatment device comprising: a processor; and a memory, wherein the processor is configured to: obtain patient information, tumor information and electric field-related information; calculate an electric field strength applied to a first tumor region based on the patient information, the tumor information and the electric field-related information; and determine the number of electrodes, locations of the electrodes and an application time based on the calculated electric field strength.

According to another embodiment of the present disclosure, a treatment device comprising: a ferroelectric electrode; an electric field generator; an electric field strength sensor; and a processor, wherein the processor is configured to: obtain patient information, tumor information and electric field-related information; calculate an electric field strength applied to a first tumor region based on the patient information, the tumor information and the electric field-related information; and determine the number of electrodes, locations of the electrodes and an application time based on the calculated electric field strength.

The features briefly summarized above with respect to the present disclosure are merely exemplary aspects of the detailed description below of the present disclosure, and do not limit the scope of the present disclosure.

According to the present disclosure, enhancement of an electric field in a portion around a local cancer tissue by a ferroelectric material probe may be considered.

According to the present disclosure, it is possible to present a precise and accurate treatment method for cancer.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
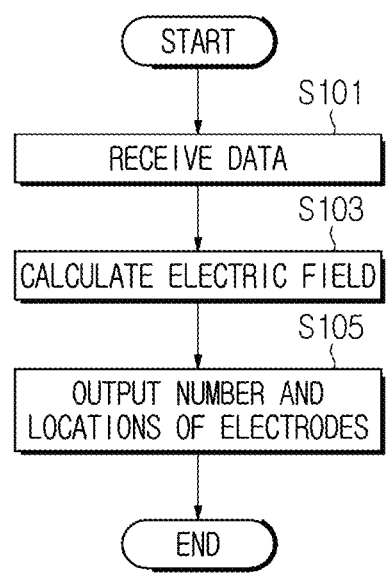
FIG. 1 shows an example of an electric field cancer treatment method using a ferroelectric nanomaterial probe according to the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

In the present document, such phrases as 'A or B', 'at least one of A and B', 'at least one of A or B', 'A, B or C', 'at least one of A, B and C' and 'at least one of A, B or C' may respectively include any one of items listed together in a corresponding phrase among those phrases or any possible combination thereof.

Cancer is usually treated on the basis of surgery, chemotherapy, and radiation therapy. Existing cancer treatment methods have problems in that the quality of life of cancer patients decreases due to increased pain of patients due to damage to normal tissues and inconvenience of hospitalization or outpatient treatment. Accordingly, efforts are being made to develop an electronic system that affects cell functions in warm-blooded mammals using a frequency control signal generator having low energy and to develop it as a cancer treatment medical device. For cancer patients with high mortality, such as brain tumors, which have not been highly effective with existing cancer treatment technologies, electromagnetic field cancer treatment devices may increase the treatment effect. In addition, the electromagnetic field cancer treatment device can improve the quality of life of a patient. Accordingly, the use of electromagnetic field cancer treatment devices as an alternative cancer treatment technology field is increasing. Research on barracks treatment that enhances the cancer treatment effect by mixing it with general cancer treatment methods is also being actively conducted. Nevertheless, there is a lack of research on electromagnetic field cancer treatment devices to reduce damage to normal cells, which must be exposed to electromagnetic fields for a long time and undergo active cell division. In addition, studies on cancer treatment methods using electromagnetic field cancer treatment devices are still lacking. The electric field cancer treatment method of the present disclosure considers environmental factors that differ from person to person. Accordingly, the present disclosure proposes an accurate and precise treatment method.

FIG. 1 shows an example of an electric field cancer treatment method using a ferroelectric nanomaterial probe according to the present disclosure. Patient's disease information regarding the location and progress of the lesion is input for each individual, and hardware information and surrounding environment information of a manufactured electric field cancer treatment device is input, and the locations and number of electrodes of the electric field treatment device are given based on a result obtained by learning existing treatment data.

The present disclosure provides a treatment method capable of minimizing the damage to normal cells generated during electric field cancer treatment, maximizing the cancer treatment effect, reducing side effects of treatment, and reducing a treatment time to increase patient satisfaction with treatment. There is a difference between an electric field treatment method using electrode information and tumor information and a treatment method devised by the present disclosure. The treatment method according to the present disclosure may provide a more precise and accurate treatment method in consideration of improvement of the electric field in a portion around a local cancer tissue by a ferroelectric material probe. The treatment method according to the present disclosure predicts and corrects the electric field strength around the electrode through measurement of the electrical properties of an additional sensor or electrode in the system to more precisely predict the electric field strength near a tumor, thereby improving treatment efficiency. In addition, the treatment method according to the present disclosure is characterized by presenting an optimal electric field treatment algorithm for each individual through learning of accumulated electric field treatment data in order to correct different treatment effects for each individual.

As an example of the present disclosure, the device may receive, as inputs, patient information, tumor information, electric field treatment information, electric field cancer treatment system environment information, and the like. Here, the electric field treatment information and the electric field cancer treatment system environment information may be electric field related information. The patient information may be a patient's age, weight, and other patient-related information. For example, the patient-related information may include a patient's treatment record and history information. Information on whether or not cancer has occurred or treatment record information for each patient may be included in the patient-related information. In addition, disease information, family history, and other information for each patient may be included in the patient-related information. Here, in the present disclosure, a personalized electric field cancer treatment system and algorithm may be established in consideration of the above-described patient information, and treatment may be performed for each patient based thereon.

That is, the personalized electric field cancer treatment system may operate through tumor information and electric field-related information as cancer incidence-related information based on information on a patient. For example, the tumor information may include carcinoma information, tumor location information, tumor size information, and other tumor-related information. For example, the carcinoma information may be information on a tumor, and the tumor location information may be information on a location where a tumor has occurred. For example, the tumor location information may be information in consideration of a relationship between a tumor location and a surrounding tissue. As a specific example, the tumor location information may further include distance information from a specific tissue as well as the location of the tumor, and is not limited to the above-described embodiment. Also, as an example, the tumor size information may be information on the size of the tumor, and may include information on the size relative to the surrounding tissue and absolute numerical information based on a numerical value, and is not limited to a specific embodiment. In addition, the tumor information may further include other information related to the tumor, and is not limited to a specific embodiment. Also, as an example, the electric field treatment information may include information on the number of treatments, time, electric field frequency, use of a ferroelectric material probe, type and size. Also, as an example, the electric field cancer treatment system environment information may include an electric field strength around electrodes, a voltage between the electrodes, current, impedance, and the like. The device may calculate and predict the electric field strength in the tumor region based on the information described above. For example, the tumor region may be a region to which an electric field applied to the tumor is applied based on the location and size of the tumor. For example, the tumor region may refer to the periphery of the tumor, may not be limited to a specific size, and may be set to a predetermined region based on the location and size of the tumor. The electric field strength for the tumor region may then be predicted based on the information described above. In addition, the number of electrodes, electrode locations, and an application time may be determined based on the calculated electric field strength. In this case, as an example, the above-described electric field strength, the number of electrodes, electrode locations, and application time may be determined for each patient, and a personalized service may be provided through this.

Here, as an example, an electric field treatment learning model may be applied when measuring an electric field strength and determining an electrode. The electric field treatment learning model may perform learning based on the above-described patient information, tumor information, and electric field-related information. More specifically, patient information, tumor information, and electric field-related information are provided as input information, and the above-described electric field strength information, the number of electrodes, the location and application time information of the electrodes are provided as output information, thereby performing learning for the electric field treatment learning model. As an example, the electric field treatment learning model may be updated after performing initial learning based on the above-described information. However, in the following, for convenience of description, it is described based on the electric field treatment learning model in which the learning is performed. That is, the electric field treatment learning model may perform learning based on the above-described information and continuously update input information and output information as feedback.

Also, as an example, the device may operate based on whether or not a ferroelectric nanoparticle probe is used. As a specific example, the ferroelectric nanoparticle probe may consider an electric field enhancement around a local cancer tissue. That is, when the ferroelectric nanoparticle probe is used, a region, to which the electric field is applied, around the cancer tissue may be narrowed and the electric field may be improved, thereby reducing the effect on normal cells around the cancer tissue.

In addition, as an example, when an electric field treatment learning model is applied to a local region based on a ferroelectric nanoparticle probe, a more precise correction may be performed, and an effective treatment service may be provided based on a personalized service and the above description.

Specifically, referring to FIG. 1, in step S101, the device may receive data. As an example, the data may include at least one of the aforementioned patient information, tumor information, or electric field-related information. Here, the electric field-related information may include electric field module information, ferromagnetic nanoparticle information, and other information related to electric fields and calculation.

Next, in step S103, the device may calculate the electric field. For example, the device may calculate the electric field based on the above-described information, and may calculate and correct the electric field for each patient based on the electric field treatment learning model. For example, electric field calculation may be performed based on an AI algorithm linked to treatment effect data by ferromagnetic nanoparticle information among patient information, tumor information, electric field module information, and ferromagnetic nanoparticle information in step S101. Here, in order to quickly calculate the electric field, the electric field may be calculated by dividing an electrode portion having a large area and a portion having ferromagnetic nanoparticles around the cancer cells, which will be described later with reference to FIG. 4.

Next, in step S105, the device may determine the number and locations of electrodes based on the calculated electric field and the above-described information. For example, the device may perform a treatment procedure including the number of electrodes, locations, a treatment time, etc. through the corrected electric field information.

In this case, as an example, the operation may be different depending on whether the ferroelectric nanoparticle probe that improves the electric field for the local region is applied to the electric field treatment learning model. For example, the ferroelectric nanoparticles may enhance the electric field for the local region as described above. Therefore, when the ferroelectric nanoparticle probe is not used, the tumor region may be set widely as the periphery of the cancer tissue. That is, on the basis of the electric field supported by the device, learning may be performed by reflecting information on each patient and tumor information in the electric field treatment learning model described above for the tumor region. As an example, patient information, tumor information, and electric field-related information may be provided as input information of the electric field treatment learning model, and electric field strength and the number of electrodes based thereon, electrode locations, and an application time may be derived as output information. In this case, weights for each of the patient information and the tumor information may be present in the electric field treatment learning model, and different results may be output for each patient by reflecting the weight information.

Also, as an example, when a ferroelectric nanoparticle probe is used, the tumor region may be narrowed. That is, since it is possible to generate an electric field for a local region, the electric field may be calculated and corrected in a narrower region than the tumor region when the ferroelectric nanoparticle probe is not used. In this case, as an example, the electric field treatment learning model may reflect patient information, tumor information, and electric field-related information based on the tumor region as a narrow region. That is, information on the use of ferroelectric nanoparticle probe may be reflected in the electric field treatment learning model, and weights of input information may be determined based on the information. Also, as output information of the electric field treatment learning model, as an example, the electric field strength, the number of electrodes, the electrode locations, and the application time may vary based on the ferroelectric nanomaterial probe. That is, since the electric field is generated in a narrower region, the applied electric field strength, the number of electrodes, the electrode locations, and the application time may also vary. That is, the electric field treatment device may operate differently depending on whether the ferroelectric nanomaterial probe is used, and may provide a personalized service.

Figure 2:
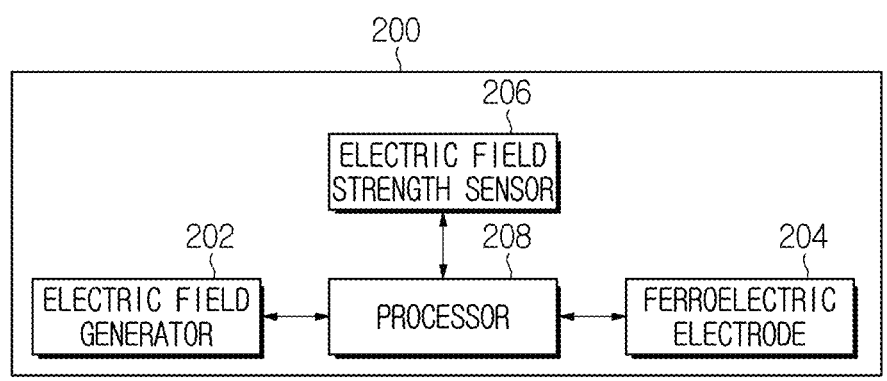
FIG. 2 shows an example of an electric field treatment device according to the present disclosure.

FIG. 2 shows an example of an electric field treatment device according to the present disclosure. The electric field treatment device 200 may include a high-frequency AC electric field generator 202, a ferroelectric electrode 204, an electric field strength sensor 206 and a processor 208. Components included in the electric field treatment device may be present outside/inside the electric field treatment device, regardless of the physical location. The processor may be used interchangeably with a computer. Computer software may control the electric field generator to adjust the strength of the electric field and the like. In addition, the computer may calculate an increased electric field strength through a ferroelectric nanomaterial probe. In addition, the computer may correct the electric field strength through the ferroelectric nanomaterial probe. In addition, the computer may calculate an optimal electric field strength based on the tumor information. The computer may correct the calculated electric field strength based on previously input electric field treatment information.

Also, the computer may determine the number and locations of the electrodes based on the calculated electric field strength. In addition, the computer may determine a treatment time based on the calculated electric field information. In addition, the computer may determine the number and locations of the electrodes that change with the treatment time. In addition, the computer may learn the artificial intelligence learning model based on previously input electric field treatment information. The computer may adjust the electric field strength or the locations and number of electrodes based on the result learned through the artificial intelligence learning model.

Figure 3:
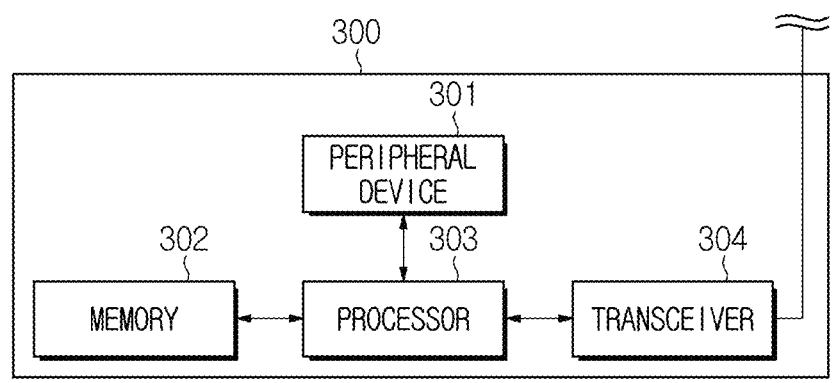
FIG. 3 shows an example of a configuration of an device according to the present disclosure.

FIG. 3 shows an example of a configuration of an device according to the present disclosure. Referring to FIG. 3, the device 300 may include a memory 302, a processor 303, a transceiver 304, and a peripheral device 301. In addition, as an example, the device may further include other components, and is not limited to the above-described embodiment. In this case, as an example, the device may be an electric field cancer treatment device. More specifically, the device 300 of FIG. 3 is exemplary hardware/software that minimizes damage to normal cells generated during electric field cancer treatment, thereby reducing side effects of treatment and reducing a treatment time to increase treatment satisfaction of the patient. In this case, as an example, the memory 302 may be a non-removable memory or a removable memory. For example, the peripheral device 301 may include an electric field generator, an electric field strength sensor, a ferroelectric electrode, and the like. In addition, the peripheral device 301 is not limited to the above-described embodiment. Also, as an example, the above-described device 300 may include a communication circuit like the transceiver 304, and may communicate with an external device based thereon.

Also, as an example, the processor 303 may include at least one of a general-purpose processor, a digital signal processor (DSP), a DSP core, a controller, a microcontroller or one or more microprocessors associated with application specific integrated circuits (ASICs), field programmable gate array (FPGA) circuits, any other tangible integrated circuits (ICs) and a state machine. That is, it may be a hardware/software component for controlling the above-described device. At this time, the processor 303 may execute computer-executable instructions stored in the memory 302 to perform various essential functions of the node. For example, the processor 303 may obtain tumor information and electric field-related information, calculate an electric field based on the obtained tumor information and the obtained electric field-related information, and determine the number and locations of electrodes based on the calculated electric field. For example, the processor 303 may control at least one of signal coding, data processing, power control, input/output processing, and communication operations. Also, the processor 303 may control a physical layer, a MAC layer, and an application layer. Also, as an example, the processor 303 may perform authentication and security procedures at an access layer and/or an application layer, and the like, and is not limited to the above-described embodiment.

Also, as an example, the processor 303 may communicate with other devices through the transceiver 304. For example, the transceiver 304 may transmit the locations and number of electrodes calculated and obtained by the processor 303 to the outside. As an example, the processor 303 may control a node to communicate with other nodes through a network through execution of computer-executable instructions. That is, communication performed in the present disclosure may be controlled. For example, the transceiver 304 may transmit an RF signal through an antenna, and may transmit a signal based on various communication networks. In addition, as an example, MIMO technology, beamforming, etc. may be applied as the antenna technology, and is not limited to the above-described embodiment. In addition, the signal transmitted/received through the transceiver 304 may be modulated and demodulated and controlled by the processor 303, and is not limited to the above-described embodiment.

Figure 4:
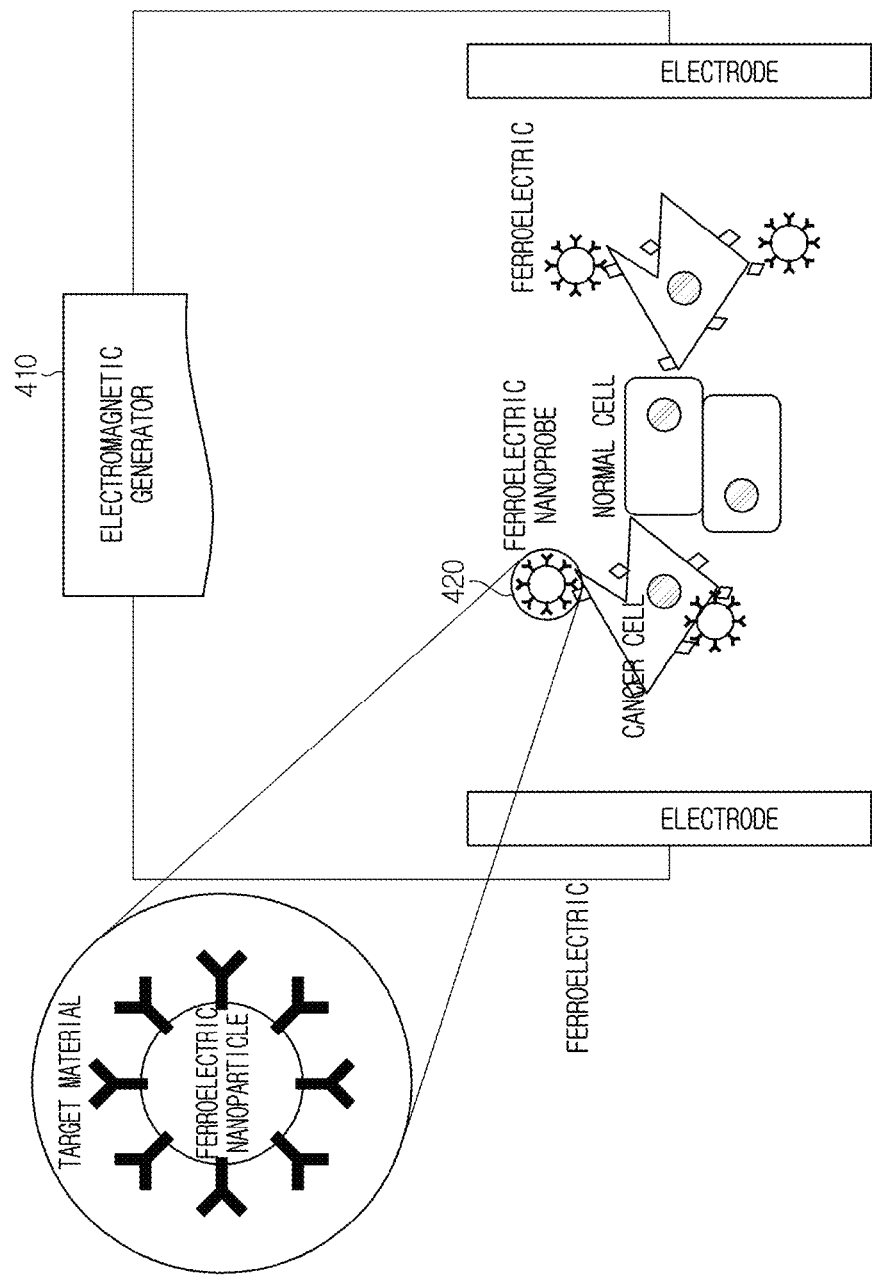
FIG. 4 is a diagram illustrating a method of performing electric field cancer treatment based on ferroelectric nanoparticles according to the present disclosure.
Figure 5:
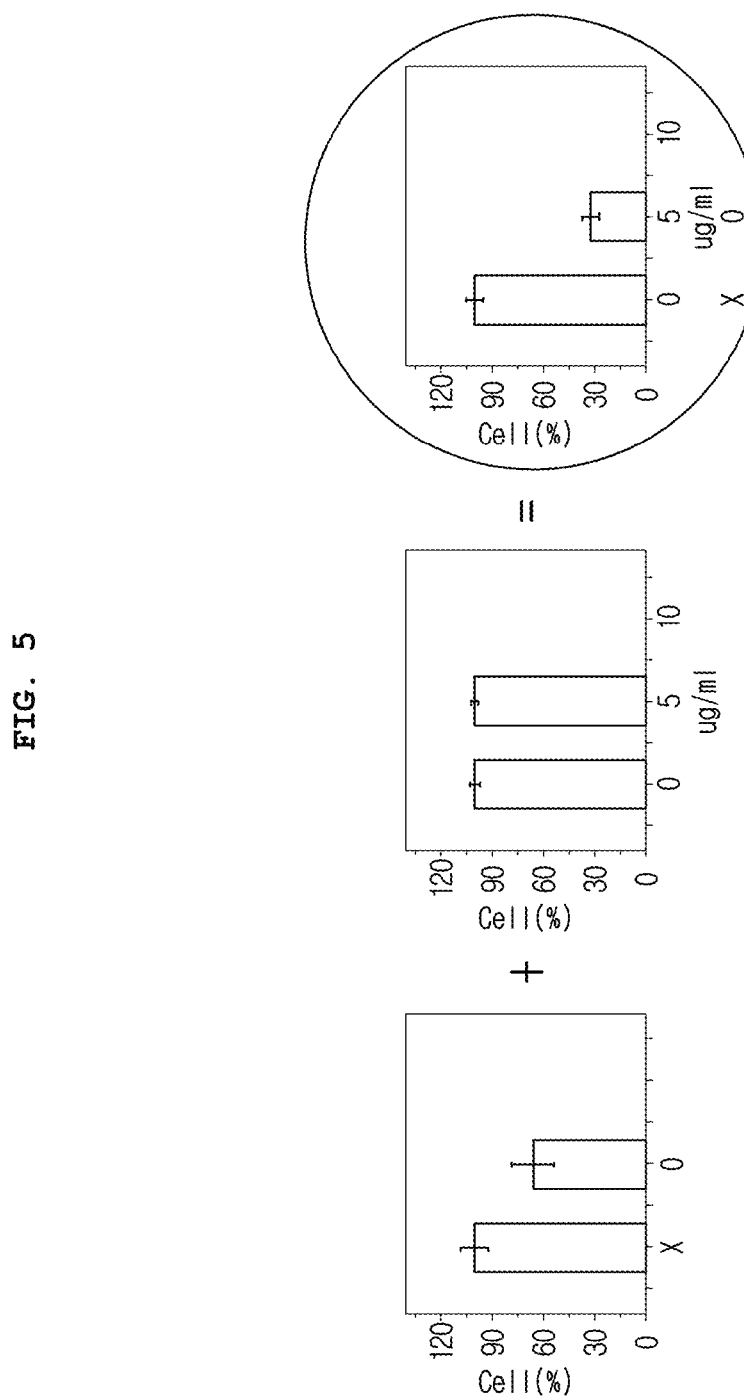
FIG. 5 is a diagram showing effects of a method of performing electric field cancer treatment based on ferroelectric nanoparticles applied in the present disclosure by comparing the anticancer treatment effect when only the electric field treatment device according to the present disclosure is used and the anticancer treatment effect when only a nanoprobe is used.

FIG. 4 is a diagram illustrating a method of performing electric field cancer treatment based on ferroelectric nanoparticles according to the present disclosure. Referring to FIG. 4, an electric field may be generated through an electromagnetic generator 410. In this case, the electric field generated through the electromagnetic generator 410 may be formed through an electrode. Here, a ferroelectric nanomaterial probe 420 as a target material may be coupled to cancer cells. That is, the ferroelectric nanomaterial probe 420 are not coupled to normal cells, but are coupled to cancer cells to provide a cancer cell treatment effect, and specific effects may be as shown in FIG. 5. Here, in the case of calculating the electric field, it is possible to divide an electrode portion with a large area and a ferroelectric nanomaterial probe 420 portion with a small area, and through this, an accurate treatment method may be provided within a short time. This will be described later with reference to FIG. 6. As a specific example, an electric field is calculated according to the above-described personalized information and the ferromagnetic nanomaterial probe 420 information based on FIG. 4, and the number and locations of the electrodes may be output through this, which may be the same as in FIG. 1.

FIG. 5 is a diagram showing effects of a method of performing electric field cancer treatment based on ferroelectric nanoparticles applied in the present disclosure by comparing the anticancer treatment effect when only the electric field treatment device according to the present disclosure is used and the anticancer treatment effect when only a nanoprobe is used. For example, referring to FIG. 5, referring to the effect of anticancer treatment when only the electric field treatment device is used (the left graph), it can be seen that cancer cells may survive more than 90% when the electric field treatment device is not used, but the survival probability of cancer cells decreases to about 60% when the electric field treatment device is used. Here, a case in which only the ferroelectric nanomaterial probe is used (second graph) may be considered. As an example, it can be confirmed that the cancer cell survival probability does not change when only the ferroelectric nanomaterial probe is used. Considering the above points, even if the ferroelectric nanomaterial probe is applied to the electric field treatment device, it may be expected that the survival probability of the actual cancer cells will not change. However, as an example, it can be confirmed that the cancer cell survival probability is reduced when the ferroelectric nanomaterial probe is applied to the electric field treatment device based on the present disclosure (last graph). More specifically, when no electric field is applied, cancer cells survive 90% or more, which may be similar to the existing one. However, when the ferroelectric nanomaterial probe is used while applying the electric field, the survival rate was 30%, which dramatically decreases the cancer cell survival rate compared to the case where only the electric field is used. That is, if the ferroelectric nanomaterial probe is applied to the electric field treatment device, the cancer cell treatment effect can be enhanced.

In addition, as an example, the cancer cell treatment effect can be enhanced through the ferroelectric nanomaterial probe at 100-500 kHz as a specific frequency in the electric field. Also, as an example, the ferroelectric nanomaterial probe may include at least one of BaTiO3, SrTiO3 or PMN-PT (Pb(MgxNby)O3-PbTiO3, but is not limited to the above-described embodiment.

Figure 6:
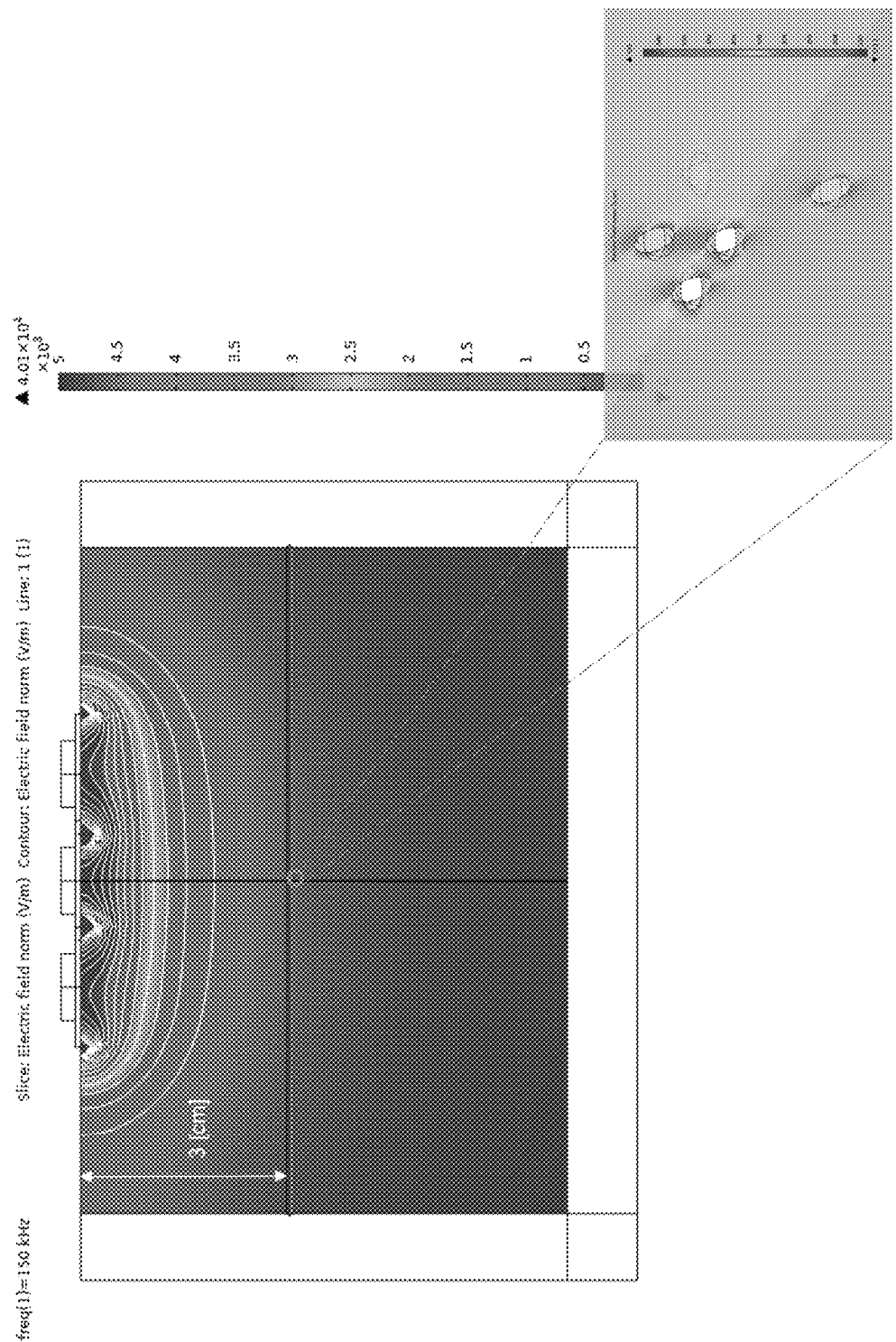
FIG. 6 is a diagram showing an electric field calculation simulation according to the present disclosure.

FIG. 6 is a diagram showing an electric field calculation simulation according to the present disclosure. As an example, the electric field may be calculated based on patient information, tumor information, electric field module information, and ferroelectric nanomaterial probe information as personalized information based on FIG. 1 described above. Here, for example, when a ferroelectric nanomaterial probe is applied to an electric field treatment device for anticancer treatment, the computer corrects the electric field strength through the ferroelectric nanomaterial probe, calculates the electric field strength based on personalized information, and then output the number and locations of electrodes. As an example, the computer may calculate and correct the electric field strength based on previously input personalized information and the aforementioned information. Here, the electric field may be calculated and corrected by dividing a first region and a second region. For example, the first region may be a nanoparticle portion and may have a small area, and the second region may be an electrode portion and may have a large area. That is, electric field calculation may be performed by dividing the region for the nanoparticle portion and the region for the electrode portion, and, through this, an accurate treatment method may be provided within a short time. As an example, the electric field may be calculated by dividing an electrode portion having a large area and a nanoparticle portion having a small area based on the artificial intelligence algorithm linked to the treatment effect data by the ferromagnetic nanomaterial probe based on the personalized information and the abovementioned information, through which the electric field may be efficiently calculated. Thereafter, based on the above-described FIG. 1, the locations and the number of electrodes may be determined according to the calculated electric field, which may be the same as FIG. 1.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A treatment method comprising:
obtaining, by a processor, patient information, tumor information and electric field-related information;
calculating, by the processor, an electric field strength applied to a first tumor region based on the patient information, the tumor information and the electric field-related information;
performing, by the processor, a correction operation of the calculated electric field strength using an electric field treatment learning model that is trained based on historical treatment data comprising patient-specific data, tumor characteristics, and previously input electric field treatment information;
determining, by the processor, the number of electrodes, locations of the electrodes and an application time based on the calculated electric field strength; and
controlling, by the processor, an electric field generator and electrodes to apply the corrected electric field to the first tumor region according to the determined number, locations, and application time.

2. The treatment method of claim 1,
wherein the patient information is individually applied for each patient applied to the treatment method, and
wherein the patient information comprises a gender, age and weight of a patient and patient-related information.

3. The treatment method of claim 2, wherein the tumor information comprises carcinoma information, tumor location information, tumor size information, and tumor-related information.

4. The treatment method of claim 3,
wherein the electric field-related information comprises electric field treatment information and electric field system environment information,
wherein the electric field treatment information comprises treatment number information, time information, electric field frequency information, and ferroelectric nanoparticle probe use information, and
wherein the electric field system environment information comprises electric field strength information around the electrodes, information on a voltage between the electrodes, current information, and impedance information.

5. The treatment method of claim 1,
wherein the electric field treatment learning model performs learning by further reflecting the patient information and the tumor information, and
wherein the correction operation is performed by calculating the electric field strength for each patient based on the patient information.

6. The treatment method of claim 5,
wherein, when a ferroelectric nanoparticle probe is not used based on the electric field-related information, the calculated electric field applied to the first tumor region is provided as input information of the electric field treatment learning model, so that the correction operation is performed based on the electric field treatment learning model, and
wherein, when the ferroelectric nanoparticle probe is used based on the electric field-related information, an electric field is calculated in a second tumor region narrower than the first tumor region, and the calculated electric field is provided as input information of the electric field treatment learning model, so that the correction operation is performed based on the electric field treatment learning model.

7. A treatment device comprising:
a processor; and
a memory,
wherein the processor is configured to:
obtain patient information, tumor information and electric field-related information;
calculate an electric field strength applied to a first tumor region based on the patient information, the tumor information and the electric field-related information;
perform a correction operation of the calculated electric field strength using an electric field treatment learning model that is trained based on historical treatment data comprising patient-specific data, tumor characteristics, and previously input electric field treatment information;
determine the number of electrodes, locations of the electrodes and an application time based on the calculated electric field strength; and
control an electric field generator and electrodes to apply the corrected electric field to the first tumor region according to the determined number, locations, and application time.

8. The treatment device of claim 7,
wherein the patient information is individually applied for each patient applied to the treatment device, and
wherein the patient information comprises a gender, age and weight of a patient and patient-related information.

9. The treatment device of claim 8, wherein the tumor information comprises carcinoma information, tumor location information, tumor size information, and tumor-related information.

10. The treatment device of claim 9,
wherein the electric field-related information comprises electric field treatment information and electric field system environment information,
wherein the electric field treatment information comprises treatment number information, time information, electric field frequency information, and ferroelectric nanoparticle probe use information, and
wherein the electric field system environment information comprises electric field strength information around the electrodes, information on a voltage between the electrodes, current information, and impedance information.

11. The treatment device of claim 7,
wherein the electric field treatment learning model performs learning by further reflecting the patient information and the tumor information, and
when the correction operation is performed by calculating the electric field strength for each patient based on the patient information.

12. The treatment device of claim 11,
wherein, when a ferroelectric nanoparticle probe is not used based on the electric field-related information, the calculated electric field applied to the first tumor region is provided as input information of the electric field treatment learning model, so that the correction operation is performed through the electric field treatment learning model, and
wherein, when the ferroelectric nanoparticle probe is used based on the electric field-related information, an electric field is calculated in a second tumor region narrower than the first tumor region, and the calculated electric field is provided as input information of the electric field treatment learning model, so that the correction operation is performed through the electric field treatment learning model.

13. A treatment device comprising:
ferroelectric electrodes;
an electric field generator configured to apply a controlled electric field to the ferroelectric electrodes;
an electric field strength sensor configured to obtain electric field-related information corresponding to the electric field applied by the electric field generator; and
a processor,
wherein the processor is configured to:
obtain patient information, tumor information and the electric field-related information;
calculate an electric field strength applied to a first tumor region based on the patient information, the tumor information and the electric field-related information;
perform a correction operation of the calculated electric field strength using an electric field treatment learning model that is trained based on historical treatment data comprising patient-specific data, tumor characteristics, and previously input electric field treatment information;
determine the number of the ferroelectric electrodes, locations of the ferroelectric electrodes, and an application time based on the calculated electric field strength; and
control the electric field generator and the ferroelectric electrodes to apply the corrected electric field to the first tumor region according to the determined number, locations, and application time.

* * * * *